(12) United States Patent
Horng et al.

(10) Patent No.: US 6,384,505 B1
(45) Date of Patent: May 7, 2002

(54) STATOR WITH A RADIAL WINDING

(75) Inventors: Alex Horng; Ching-Shen Hong, both of Kaohsiung; Tso-Kuo Yin, Kaohsiung Hsien, all of (TW)

(73) Assignee: Sunonwealth Electric Machine Industry, Kaohsiung (TW)

( * ) Notice: Subject to any disclaimer, the term of this patent is extended or adjusted under 35 U.S.C. 154(b) by 0 days.

(21) Appl. No.: 09/969,665

(22) Filed: Oct. 4, 2001

(51) Int. Cl.$^7$ .................................................. H02K 1/06
(52) U.S. Cl. ........................ 310/186; 310/216; 310/218; 310/185
(58) Field of Search ........................... 310/90, 185, 186, 310/216, 218

(56) References Cited

U.S. PATENT DOCUMENTS

| | | | | |
|---|---|---|---|---|
| 4,281,265 A | * | 7/1981 | Eastham et al. ............. | 310/254 |
| 4,554,491 A | * | 11/1985 | Plunkett ...................... | 318/254 |
| 4,818,911 A | * | 4/1989 | Taguchi et al. .............. | 310/259 |
| 5,739,614 A | * | 4/1998 | Suzuki et al. ................ | 310/180 |
| 5,859,487 A | * | 1/1999 | Chen ........................... | 310/254 |
| 6,097,120 A | * | 8/2000 | Horng .......................... | 310/90 |
| 6,127,760 A | * | 10/2000 | Nagasaki et al. ............ | 310/254 |
| 6,225,722 B1 | * | 5/2001 | Rupp et al. .................. | 310/91 |

* cited by examiner

Primary Examiner—Nestor Ramirez
Assistant Examiner—Heba Y. Elkassabgi
(74) Attorney, Agent, or Firm—Bacon & Thomas, PLLC

(57) ABSTRACT

A stator comprises plural stacked silicon steel plates having aligned axle holes. An auxiliary plate is superimposed on the stacked silicon steel plates and comprises an axle hole aligned with the axle holes of the silicon steel plates. Each silicon steel plate comprises even-numbered radial arms each having a magnetic pole face at a distal end thereof. The auxiliary plate comprises auxiliary radial arms, wherein the auxiliary radial arms and the radial arms of the silicon steel plates are alternately disposed. Form on a distal end of each auxiliary radial arm is a magnetic pole face that extends vertically, the magnetic pole face being appropriately spaced from the magnetic pole faces of the radial arms of the silicon steel plates. The magnetic pole faces of the auxiliary radial arms of the auxiliary plate and the magnetic pole faces of the silicon steel plates have different widths or thicknesses.

6 Claims, 3 Drawing Sheets

STATOR WITH A RADIAL WINDING

BACKGROUND OF THE INVENTION

1. Field of the Invention

The present invention relates to a stator with a radial winding. In particular, the present invention relates to a stator with a radial winding that may reduce the magnetic force, lower the starting voltage, and avoid dead angle of rotation, thereby increasing the rotating torque of the motor.

2. Description of the Related Art

FIG. 1 of the drawings illustrates a conventional stator comprising plural identical silicon steel plates 90 that are stacked together. Each silicone steel plate comprises even sets of radial arms 91 around which a winding 92 is wound. Formed between each two adjacent radial arms 91 is an auxiliary radial arm 91 without winding. Thus, when the winding 92 is supplied with electric current, since the auxiliary radial arms 93 have no polarity, the radial arms 91 and the auxiliary radial arms of the stacked silicon steel plates 90 induct with the permanent ring magnet of the rotor to generate uneven induction, thereby starting the rotor easily.

SUMMARY OF THE INVENTION

An object of the present invention is to provide a stator with a radial winding to allow easy starting of the rotor and to increase the rotating torque of the rotor while reducing the material and weight of the stator.

Another object of the present invention is to provide a stator with a radial winding that allows easy winding around each radial arm of the stator in addition to easy starting of the rotor, increase in the rotating torque of the rotor, and reduction in the material and weight of the stator.

A stator in accordance with the present invention comprises plural stacked silicon steel plates having aligned axle holes and assembling holes. Each silicon steel plate comprises even-numbered radial arms each having a magnetic pole face at a distal end thereof. In addition, an auxiliary plate is superimposed on the stacked silicon steel plates and comprises an axle hole aligned with the axle holes of the silicon steel plates and assembling holes aligned with the assembling holes of the silicon steel plates. The auxiliary plate comprises auxiliary radial arms, wherein the auxiliary radial arms and the radial arms of the silicon steel plates are alternately disposed. Form on a distal end of each auxiliary radial arm is a magnetic pole face that extends vertically, the magnetic pole face being appropriately spaced from the magnetic pole faces of the radial arms of the silicon steel plates. The magnetic pole faces of the auxiliary radial arms of the auxiliary plate and the magnetic pole faces of the silicon steel plates have different widths or thicknesses. Positioning elements are extended through the aligned assembling holes of the silicon steel plates and the auxiliary plate to thereby engage the silicon steel plates and the auxiliary plate together.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
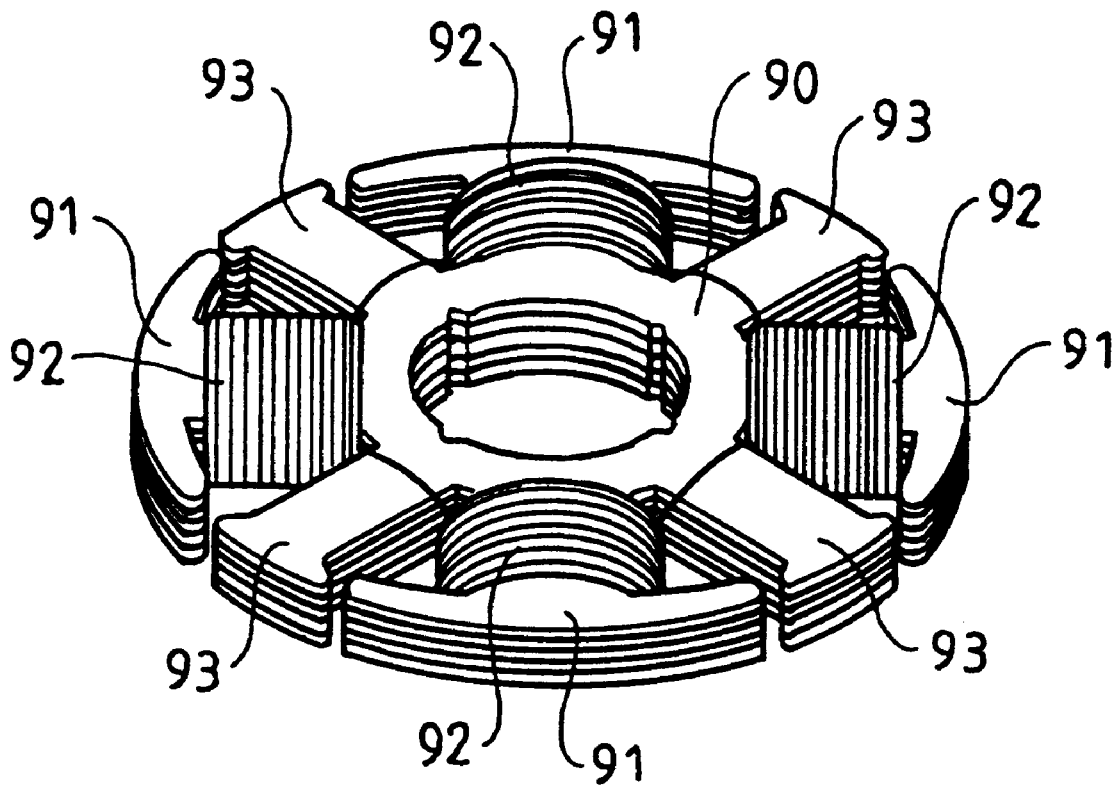
FIG. 1 is an exploded perspective view of a conventional stator.
Figure 2:
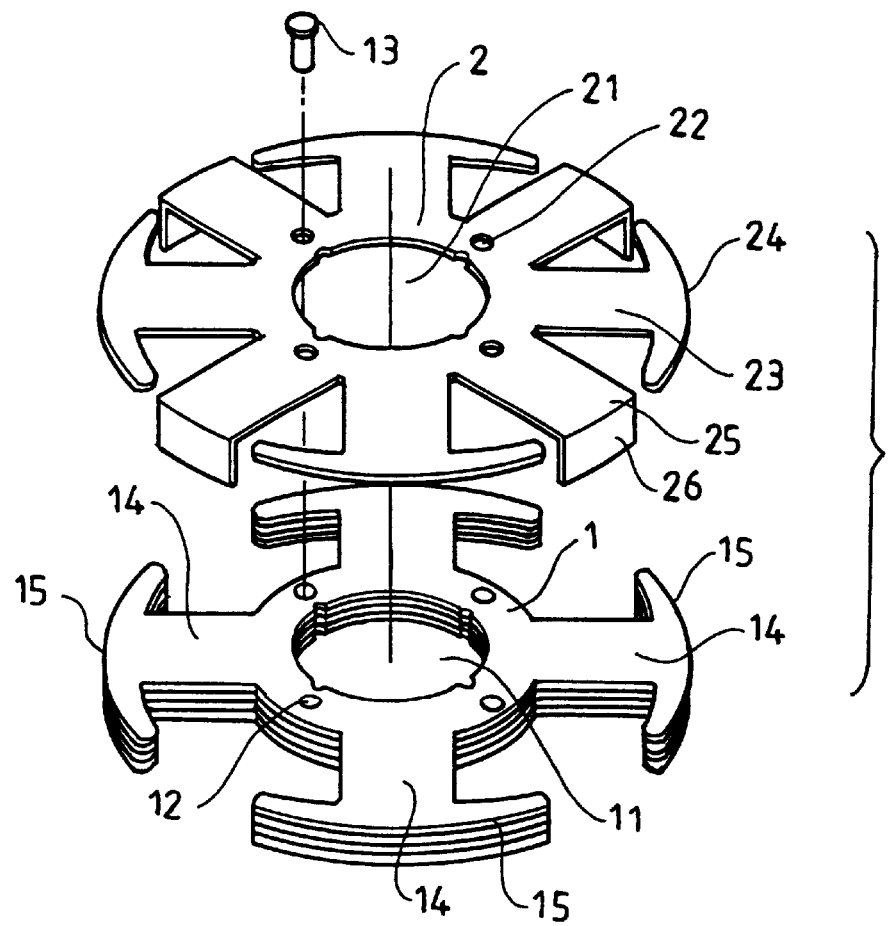
FIG. 2 is an exploded perspective view of a first embodiment of a stator in accordance with the present invention.
Figure 3:
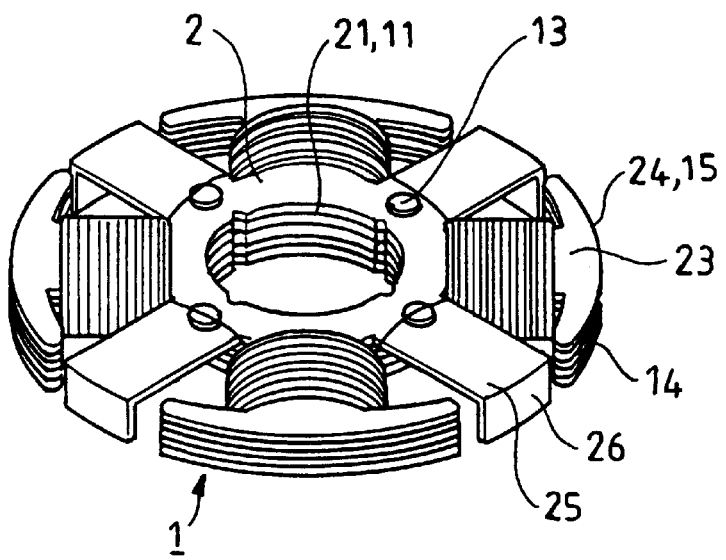
FIG. 3 is a perspective view of the stator in FIG. 2.

Referring to FIGS. 2 and 3, a first embodiment of a stator in accordance with the present invention generally includes plural silicon steel plates 1 and an auxiliary plate 2.

The silicon steel plates 1 are made of magnetically conductive material and have identical shapes. Preferably, at least two silicon steel plates I are stacked up, each silicon steel plate 1 having an axle hole 11 and plural assembling holes 12. An axle tube (not shown) is extended through the aligned axle holes 11 of the aligned silicon steel plates 1. Positioning elements 13 are extended through the aligned assembling holes 12 of the silicon steel plates 1 and assembling holes 22 of the auxiliary plate 2, thereby securing the silicon steel plates 1 and the auxiliary plate 2 together. Each silicon steel plate 1 has plural radial arms 14 each having a magnetic pole face 15 at a distal end thereof for induction with a permanent ring magnet (not shown) of a rotor (not shown).

The auxiliary plate 2 is also made of magnetically conductive material and comprises an axle hole 21 and plural assembling holes 22. The axle hole 22 of the auxiliary plate 2 is aligned with the axle holes 12 of the silicon steel plates 1 for extension of an axle tube. The assembling holes 22 of the auxiliary plate 2 are aligned with the assembling holes 12 of the silicon steel plates 1 for extension of the positioning elements 13 to thereby secure the silicon steel plates 1 and the auxiliary plate 2 together. The auxiliary plate 2 comprises plural radial arms 23 aligned with the radial arms 14 of the silicon steel plate 1, each radial arm 23 having a magnetic pole face 24 at a distal end thereof The auxiliary plate 2 further comprises auxiliary radial arms 25 each of which is formed between each two adjacent radial arm 23. A distal end of each auxiliary radial arm 25 has a magnetic pole face 26 that extends vertically. The magnetic pole faces 26 of the auxiliary plate 2 and the magnetic pole faces 15 of the silicon steel plates 1 are alternately disposed and have a space therebetween. The magnetic pole faces 26 of the auxiliary plate 2 and the magnetic pole faces 15 of the silicon steel plates 1 have different widths or thicknesses.

Referring to FIG. 3, in assembly, the axle holes 11 of the silicon steel plates 1 are aligned with the axle hole 21 of the auxiliary plate 2, and an axle tube (not shown) is extended through the axle holes 11 and 21. The positioning elements 13 are extended through the aligned assembling holes 12 and 22 to secure the silicon steel plates 1 and the auxiliary plate 2 together. Next, a winding (not labeled) is wound around the radial arms 14 and 23 of the silicon steel plates 1 and the radial arms 25 of the auxiliary plate 2 to thereby form a stator. The magnetic pole faces 15 and 24 of the silicon steel plates 1 that are aligned with the magnetic pole faces 24 of the auxiliary plate 2. In addition, the magnetic pole faces 15 of the silicon steel plates 1 and the magnetic pole faces 26 of the auxiliary radial arms 25 of the auxiliary plate 2 are alternately disposed and have different widths or thicknesses. Thus, a larger inductive area is provided between the stator and the permanent magnet of the rotor to provide a larger rotating torque with the rotor. In addition, since the aligned magnetic pole faces 15 and 24 and the magnetic pole faces 26 of the auxiliary radial arms 25 of the auxiliary plate 2 have different widths or thicknesses, the magnetic pole faces 15, 24 and the magnetic pole face 26 cause uneven magnetic flux to have an uneven induction with the permanent magnet of the rotor. Thus, the rotor can be started easily. Therefore, when the permanent magnet of the rotor induct with these magnetic pole faces 15, 24, and 26, the rotor can be easily started without leaving any dead angle of rotation.

Figure 4:
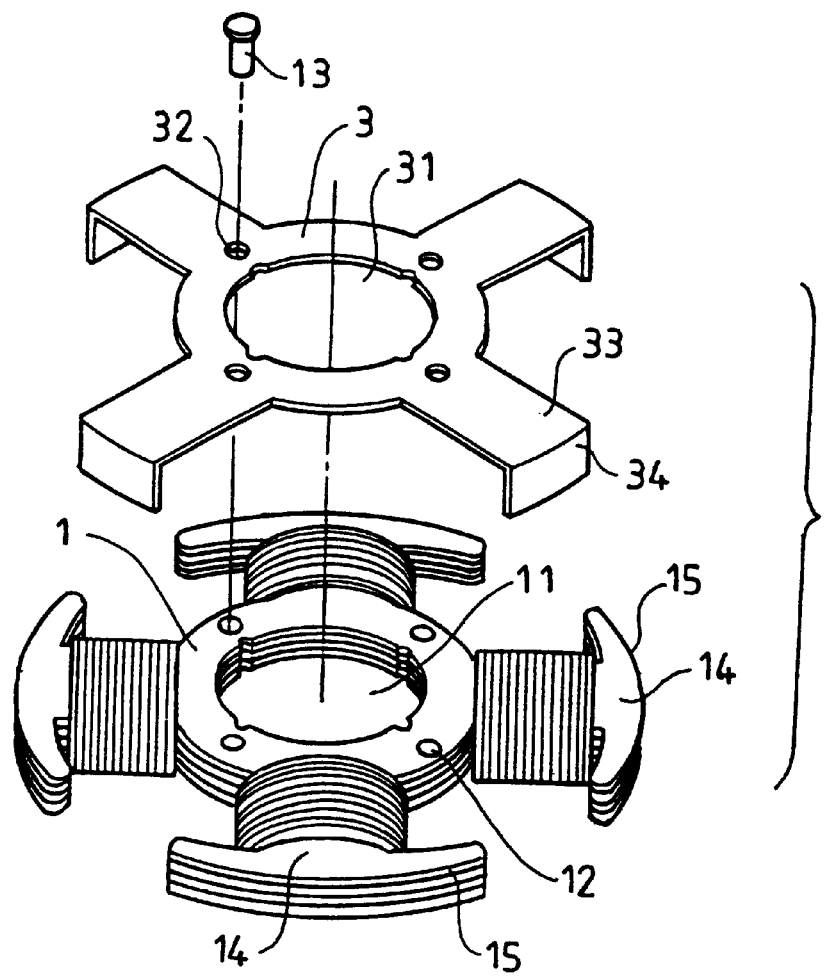
FIG. 4 is an exploded perspective view of a second embodiment of the stator in accordance with the present invention.
Figure 5:
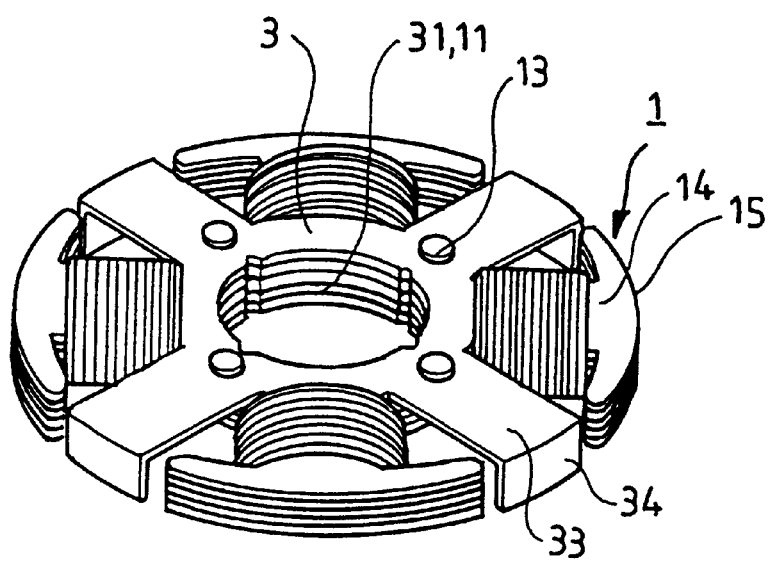
FIG. 5 is a perspective view of the stator in FIG. 4.

FIGS. 4 and 5 illustrate a second embodiment of the stator in accordance with the present invention comprising plural silicon steel plates 1 and an auxiliary plate 3.

The silicon steel plates 1 are identical to those of the first embodiment. In this embodiment, the auxiliary plate 3 comprises an axle hole 31, plural assembling holes 32 and plural auxiliary radial arms 33 each having a vertically extending magnetic pole face 34 at a distal end thereof. The magnetic pole faces 34 of the auxiliary plate 3 and the magnetic pole faces 15 of the silicon steel plates 1 have different widths or thicknesses.

In this embodiment, the silicon steel plates 1 are firstly stacked up, and a winding (not labeled) is wound around the radial arms 14 of the silicon plates 1. Next, positioning elements 13 are provided to secure the auxiliary plate 3 and the silicon steel plates 1 together. Thus, in the stator of this embodiment, since the winding is proceeded before the auxiliary plate 3 is engaged onto the silicon steel plates 1, the magnetic pole faces 15 of the silicon steel plates 1 have a larger space therebetween to allow easy winding. In addition, the magnetic pole faces 15 of the silicon steel plates 1 and the magnetic pole faces 34 of the auxiliary radial arms 33 of the auxiliary plate 3 have different widths or thicknesses after the winding procedure, thereby providing uneven induction with the permanent magnet of the rotor. Thus, the rotor can be started easily. Therefore, when the permanent magnet of the rotor induct with these magnetic pole faces 15 and 34, the rotor can be easily started.

In the stator in accordance with the present invention having magnetic pole faces of different widths or thickness, unequal magnetic flux is formed among the magnetic pole faces, and these magnetic pole faces have uneven induction with the permanent magnet of the rotor. Thus, the rotor can be easily started without leaving any dead corner of rotation. In addition, when the winding procedure is proceeded on the stacked silicon steel plates before the auxiliary plate is engaged onto the silicon steel plates, the winding procedure can be easily accomplished, as the magnetic pole faces of the silicon steel plates have a larger gap therebetween.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A stator with a radial winding, the stator comprising:

plural stacked silicon steel plates having aligned axle holes, said plural stacked silicon steel plates comprising even-numbered radial arms each having a magnetic pole face at a distal end thereof;

an auxiliary plate superimposed on said plural stacked silicon steel plates, said auxiliary plate comprising an axle hole aligned with the aligned axle holes of said plural stacked silicon steel plates, said auxiliary plate further comprising plural auxiliary radial arms, said plural auxiliary radial arms of said auxiliary plate and said radial arms of said plural stacked silicon steel plates being alternately disposed, each said auxiliary arm including a vertically extending magnetic pole face at a distal end thereof, each said magnetic pole face of said auxiliary plate being spaced from said magnetic pole faces on said distal ends of said radial arms of said silicon steel plates.

2. The stator with a radial winding as claimed in claim 1, wherein said auxiliary plate comprises plural radial arms each having a magnetic pole face, said radial arms of said auxiliary plate being aligned with said radial arms of said silicon steel plates, said magnetic pole faces of said radial arms of said auxiliary plate being aligned with said magnetic pole faces of said radial arms of said silicon steel plates.

3. The stator with a radial winding as claimed in claim 1, further comprising a winding wound around said radial arms of said silicon steel plates before said auxiliary plate is engaged onto said silicon steel plates.

4. The stator with a radial winding as claimed in claim 2, further comprising a winding wound around said radial arms of said silicon steel plates and said radial arms of said auxiliary plate that are stacked up.

5. The stator with a radial winding as claimed in claim 1, wherein said silicon steel plates and said auxiliary plate comprise aligned assembling holes, further comprising plural positioning elements extending through said aligned assembling holes for securing said silicon steel plates and said auxiliary plate together.

6. The stator with a radial winding as claimed in claim 1, wherein said magnetic pole faces of said auxiliary radial arms of said auxiliary plate and said magnetic pole faces of said radial arms of said silicon steel plates are alternately disposed and have different widths or thicknesses.

* * * * *